US007961914B1

(12) United States Patent
Smith

(10) Patent No.: US 7,961,914 B1

(45) Date of Patent: Jun. 14, 2011

(54) PORTABLE STORAGE APPARATUS WITH INTEGRAL BIOMETRIC-BASED ACCESS CONTROL SYSTEM

(76) Inventor: Robert J. D. Smith, Houston, TX (US)

( * ) Notice: Subject to any disclaimer, the term of this patent is extended or adjusted under 35 U.S.C. 154(b) by 1002 days.

(21) Appl. No.: 11/485,004

(22) Filed: Jul. 12, 2006

Related U.S. Application Data

(60) Provisional application No. 60/698,342, filed on Jul. 12, 2005.

(51) Int. Cl.
*G06K 9/00* (2006.01)
*E05B 45/06* (2006.01)
*G08B 13/14* (2006.01)

(52) U.S. Cl. ..................... 382/115; 340/542; 340/568.7; 340/571; 340/572.1; 340/5.52; 70/277; 70/416

(58) Field of Classification Search .................. 340/541, 340/542, 568.1, 568.7, 571, 5.52, 5.53, 5.8–5.84; 382/115, 117, 118, 124; 704/246
See application file for complete search history.

(56) References Cited

U.S. PATENT DOCUMENTS

| | | | | |
|---|---|---|---|---|
| 4,210,899 | A * | 7/1980 | Swonger et al. | 382/125 |
| 4,890,094 | A | 12/1989 | Kopel | |
| 5,408,212 | A * | 4/1995 | Meyers et al. | 340/427 |
| 5,412,373 | A | 5/1995 | Wajda | |
| 5,790,027 | A | 8/1998 | Chern | |
| 5,812,252 | A * | 9/1998 | Bowker et al. | 356/71 |
| 5,920,260 | A | 7/1999 | Tseng | |
| 6,111,977 | A | 8/2000 | Scott et al. | |
| 6,283,504 | B1 * | 9/2001 | Stanley et al. | 280/735 |
| 6,320,975 | B1 * | 11/2001 | Vieweg | 382/124 |
| 6,400,270 | B1 | 6/2002 | Person | |
| 6,421,453 | B1 * | 7/2002 | Kanevsky et al. | 382/115 |
| 6,462,660 | B1 * | 10/2002 | Cannon et al. | 340/572.1 |
| 6,525,932 | B1 * | 2/2003 | Ohnishi et al. | 361/679.41 |
| 6,606,029 | B1 | 8/2003 | Okamura | |
| 6,628,812 | B1 * | 9/2003 | Setlak et al. | 382/124 |
| 6,653,723 | B2 * | 11/2003 | Manansala | 257/680 |
| 6,657,538 | B1 * | 12/2003 | Ritter | 340/5.81 |

(Continued)

OTHER PUBLICATIONS

Bean et al. (Jun. 2003) "PIMs: Is it time to give up your day planner?" J. Corporate Accounting and Finance, vol. 14 No. 5, pp. 41-47.*

*Primary Examiner* — Bhavesh M Mehta
*Assistant Examiner* — Barry Drennan
(74) *Attorney, Agent, or Firm* — Montgomery Patent Design; Robert C. Montgomery

(57) ABSTRACT

A system and method by which a portable, personal storage container can be secured and protected using the owner's fingerprint is herein disclosed. While the features of the invention can be incorporated into almost any type of physical container, it is most likely to be envisioned to be incorporated into a wallet, purse, sack or eyeglass case. The invention relies on a biometric sensor that recognizes the owner's fingerprint, and unlocks the container when a match is presented. In addition to physical storage and security, the invention also provides electronic storage for computer files such as electronic files, documents, photos and the like via an integral computer connector. Finally, the invention is provided with a proximity sensor that detects when it has been moved more than a preset distance away from the rightful owner. This feature thus provides security against theft. The use of the present invention provides storage and protection for all-important items, whether physical or electronic, in a manner, which is not only quick, easy and effective, but safe and secure as well.

14 Claims, 4 Drawing Sheets

U.S. PATENT DOCUMENTS

| | | | | |
|---|---|---|---|---|
| 6,707,382 | B2 * | 3/2004 | Pedersen | 340/568.1 |
| 6,775,776 | B1 * | 8/2004 | Vogt et al. | 713/186 |
| 7,423,515 | B1 * | 9/2008 | Fiske et al. | 340/5.2 |
| 2002/0034321 | A1 * | 3/2002 | Saito et al. | 382/124 |
| 2003/0189488 | A1 * | 10/2003 | Forcier et al. | 340/572.1 |
| 2003/0228791 | A1 * | 12/2003 | Milan | 439/502 |

* cited by examiner

PORTABLE STORAGE APPARATUS WITH INTEGRAL BIOMETRIC-BASED ACCESS CONTROL SYSTEM

RELATED APPLICATIONS

The present invention was first described in U.S. Provisional Patent No. 60/698,342 filed on Jul. 12, 2005.

FIELD OF THE INVENTION

The present invention relates generally to storage containers with proximity alarms and more particularly to storage containers configured with proximity alarms, which have integral biometric-based access control systems for preventing thefts.

BACKGROUND OF THE INVENTION

The development of electronics and computer technology has revolutionized virtually all aspects of our lives. Appropriately deemed the information age, this technology allows anyone anywhere who has access to a computer to communicate with and tap the knowledge of individuals and organizations throughout the world. These circumstances have led directly to the development of personal digital assistants or PDA's, cellular phones, and other such devices to store and protect our virtual property and keep it secure from others. While these devices do a good job with electronic data, they do nothing to help protect our physical property such as credit cards, cash, car keys and similar items. In fact, physical items such as these are more prone to theft and often cause greater hardship for the owner if they are stolen.

The use of biometrics involves sophisticated technological devices to recognize unique physical traits of a human being, typically fingerprints, voice wave patterns, signatures, eye retinas and three-dimensional face patterns. Today's biometric assays match a stored, pre-authorized user's unique physical traits with information gleaned at an access point via a biometric analyzer, which measures and then analyzes said data. If the access point information matches that of a user in an authorized dataset, the user is then authenticated, and access is permitted. If not, access is not permitted and an alarm is usually transmitted either audibly, to security personnel or both. These access points are usually information-sensitive areas such as bank vaults, government facilities and heavy technology plants where safety is of a concern to those not trained in the area.

Accordingly, there exists a need for a means by which safe and secure storage for both physical and virtual belongings can be provided without the disadvantages described above.

A search of the prior art did not disclose any patents that read directly on the claims of the instant invention; however, the following references were considered related. U.S. Pat. No. 6,111,977 issued in the name of Scott et al. provides for a portable fingerprint recognition transmitter. It differs form the present invention in that it is not an integral device for concurrent use with a personal storage apparatus such as an attaché case, purse or similar item.

U.S. Pat. No. 6,400,270 issued in the name of Person describes a wallet security system with a selectively openable casing having a pressure-sensitive sensor means. The Person device does not include a biometric-based control access system for permitting pre-authorized access to the interior contents of a personal storage device.

U.S. Pat. No. 4,890,094 issued in the name of Kopel discloses a wallet incorporating a credit card alarm system incorporating flexible sheet materials with means for monitoring the absence of a credit card from within a wallet and emitting an audible alarm. This device does not include a biometric assay for permitting access for the interior of a wallet or similar article as in the present invention.

U.S. Pat. No. 5,790,027 issued in the name of Chern similarly describes a wallet having an alarm system for detecting a missing or partially inserted card or similar object.

U.S. Pat. No. 5,412,373 issued in the name of Wajda discloses a wallet security device that detects when a wallet has been removed front within a user's pocket or purse. Again, the Wajda patent does not fall under the full scope of the present invention in that it does not involve a biometric-based security system to permit a user access to contents within a personal storage device.

U.S. Pat. No. 6,606,029 issued in the name of Okamura refers an electronic tag device attachable to products such as personal items, clothing, or accessories. Although designed to be attachable to an article for security purposes, the Okamura device does not purport to provide limited access via a novel biometric authorization system.

U.S. Pat. No. 5,920,260 issued in the name of Tseng discloses a burglarproof structure equipped with a sound emitter and strap for installation on a purse. The Tseng device also does not fall under the scope of the present invention.

Consequently, there is a need for a means by which one can provide limited access to contents within a personal portable storage device, such as wallets, purses, backpacks, attaché cases, briefcases or other similar articles where important and/or personal documents and possessions, with a biometric-based access control system, such as fingerprint matching, voice recognition or retina scan, to authenticate a user's access rights.

SUMMARY OF THE INVENTION

In view of the foregoing disadvantages inherent in the prior art, it has been observed that there is need of a security system in the form of a biometric-based access control system, particularly for the use of portable storage devices.

Therefore, it is an object of the present invention to obviate the above and other disadvantages of the existing art.

Furthermore, it is an object of the present invention to provide a portable storage apparatus with an integral biometric-based access control system that addresses the above-mentioned needs.

Furthermore, an object of the present invention is to provide a portable storage device that is secured using the owner's unique biometric data, such as a fingerprint, voice pattern, three-dimensional face pattern, eye retina pattern, and the like.

To achieve the above and other objectives, the present invention provides a portable storage apparatus with an integral biometric-based access control system comprising a personal storage device; a power unit for providing power to the portable storage apparatus with an integral biometric-based access control system; a biometric sensor configured to sense the biometric features of a user; a proximity gauging unit programmed with a predetermined distance, having proximity receivers and proximity antenna for gauging the proximity of the personal storage device from the portable storage apparatus with an integral biometric-based access control system; data storage for storing electronic data; a controller for controlling the operations of the personal storage device from the portable storage apparatus with an integral biometric-based access control system; and an alarming unit for signaling an alarm upon repeated mismatch of biometric features of a user or increasing proximity of the personal storage device from the portable storage apparatus with an integral biometric-based access control system beyond the predetermined distance.

Furthermore, an object of the present invention is to provide a method of configuring a proximity alarm for preventing theft of a portable storage device using a portable storage apparatus with an integral biometric-based access control system that has a biometric sensor, a proximity gauging unit programmed with a predetermined distance and an alarming unit. The method comprises setting an authorized retailer program with a biometric signature in the biometric sensor; configuring a predetermined distance in the proximity gauging unit; configuring the first proximity receiver integral to the portable storage apparatus with an integral biometric-based access control system; carrying the second proximity receiver with a user; and signaling an alarm either upon repeated mismatch of the biometric signature or increasing proximity of the personal storage device from the portable storage apparatus with an integral biometric-based access control system beyond the predetermined distance.

The object of the present invention is to provide a portable storage device, secured using the owner's fingerprint. While the features of the invention can be incorporated into almost any type of physical container, it is most likely envisioned to be incorporated into a wallet, purse, sack or eyeglass case. The invention relies on a biometric sensor that recognizes the owner's unique biometric data and unlocks the container when a match is presented. In addition to physical storage and security, the invention also provides electronic storage for computer files such as electronic files, documents, photos, and similar items via an integral computer connector. The proximity sensor of the present invention detects when it has been moved more than a preset distance away from the rightful owner. Thus, this feature provides security against theft. The use of the innovative device provides storage and protection for all-important items, whether physical or electronic, in a manner, which is not only quick, easy, and effective, but safe and secure as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | portable storage apparatus with integral biometric-based access control system |
| 15 | personal storage device |
| 20 | top flap |
| 25 | securing snap |
| 30 | battery compartment |
| 35 | battery compartment interlock |
| 40 | biometric sensor |
| 45 | solenoid-based access device |
| 50 | enclosure material |
| 55 | wallet |
| 60 | computer case |
| 65 | notebook |
| 70 | first proximity receiver |
| 75 | proximity antenna |
| 80 | second proximity receiver |
| 85 | radio frequency (RF) wave |
| 90 | distance setting control |
| 95 | memory storage device |
| 100 | interface cable switch |
| 105 | interface connector |
| 110 | main controller |
| 115 | battery |
| 120 | biometric driving circuit |
| 125 | internal alarm horn |

DETAILED DESCRIPTION OF THE PREFERRED EMBODIMENT

Figure 1:
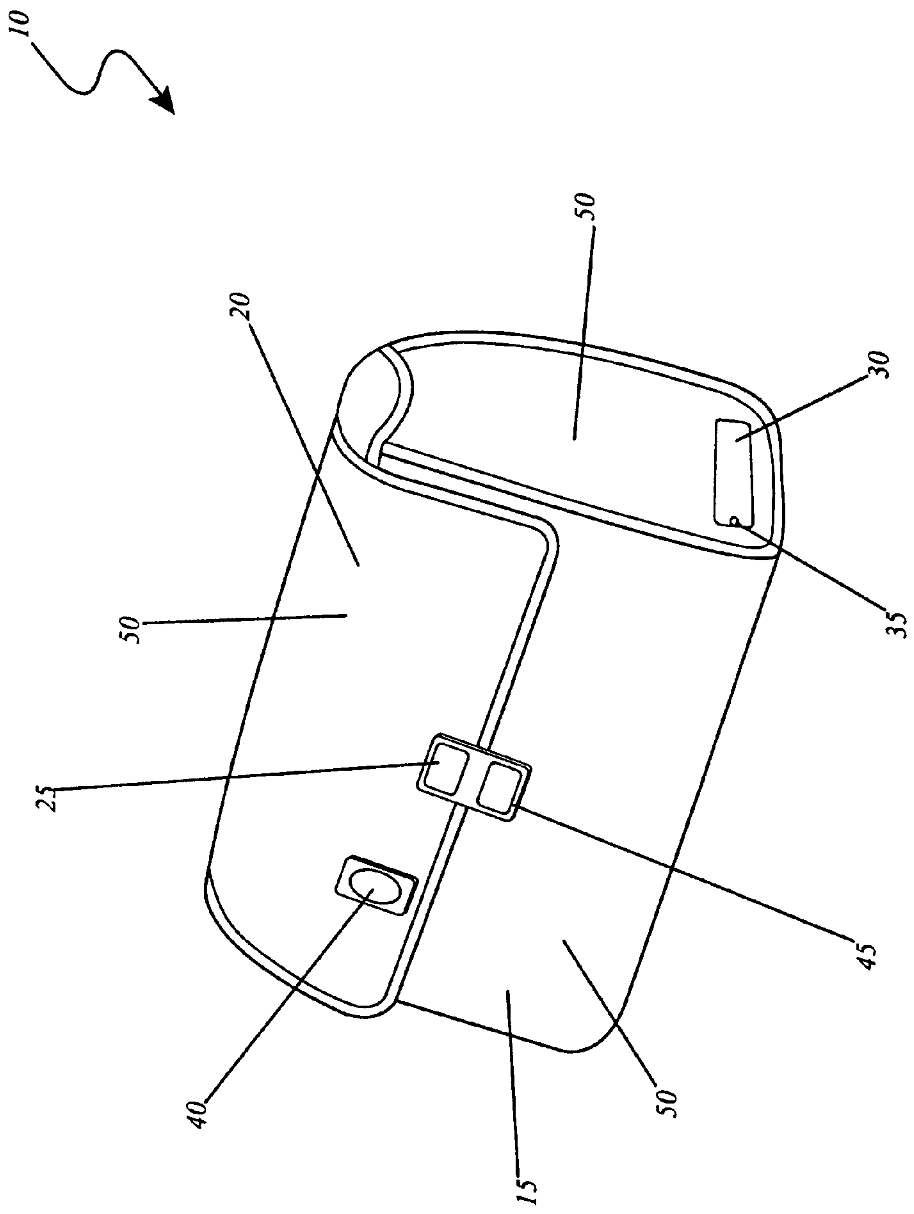
FIG. 1 is an isometric view of the portable storage apparatus with integral biometric-based access control system 10 shown in use on a personal storage device 15 in a closed and secured state, according to the preferred embodiment of the present invention; and, FIG. 1*a* is an isometric view of the portable storage apparatus with integral biometric-based access control system 10 shown in use on a wallet 55, according to the preferred embodiment of the present invention; and, FIG. 1*b* is an isometric view of the portable storage apparatus with integral biometric-based access control system 10 shown in use on a computer case 60, according to the preferred embodiment of the present invention; and, FIG. 1*c* is an isometric view of the portable storage apparatus with integral biometric-based access control system 10 shown in use on a notebook 65, according to the preferred embodiment of the present invention; and, FIG. 2 is a isometric view of the portable storage apparatus with integral biometric-based access control system 10 shown in use on a personal storage device 15 in an open and unsecured state, according to the preferred embodiment of the present invention; and, FIG. 3 is a schematic block diagram of the major electrical components as used in the portable storage apparatus with integral biometric-based access control system 10, according to the preferred embodiment of the present invention.
Figure 2:
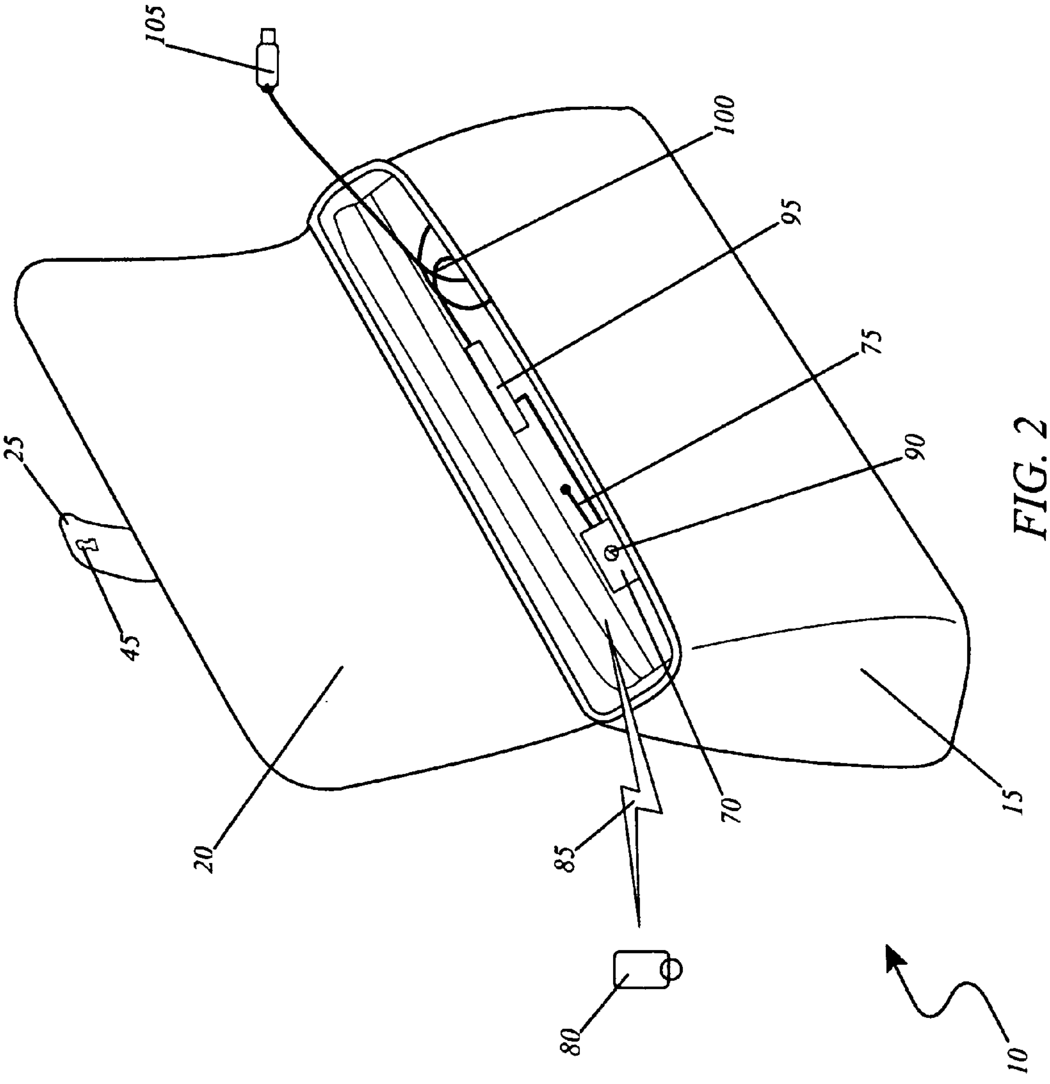
Figure 3:
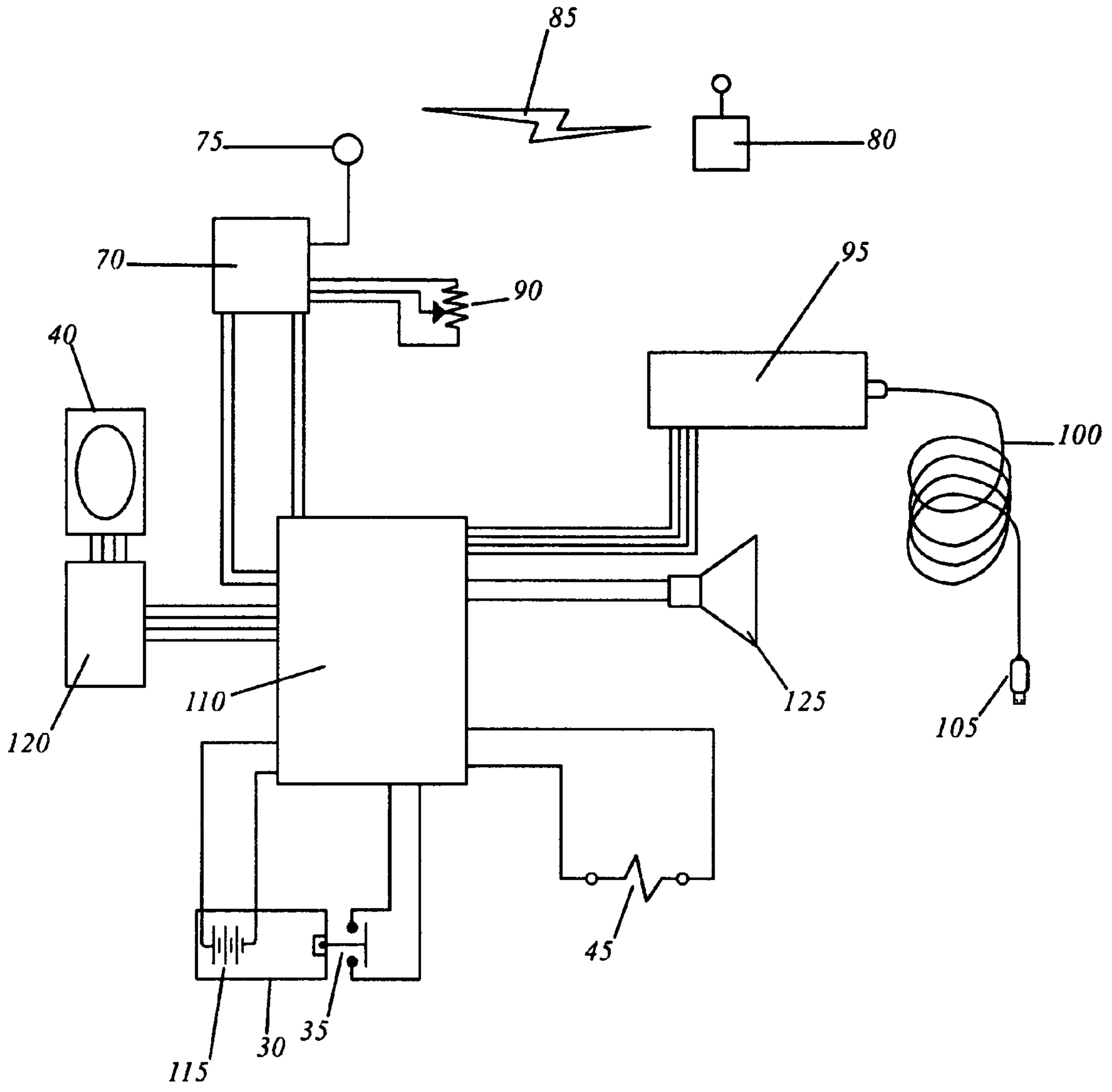

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1 an isometric view of the portable storage apparatus with integral biometric-based access control system 10 is shown in use on a personal storage device 15 in a closed and secured state, according to the preferred embodiment of the present invention. The personal storage device 15 is depicted in general appearance as a handbag, a women's purse, a computer bag, or any generic bag that is typically secured by a fastening device, such as but not limited to, a top flap 20 and a securing snap 25. The portable storage apparatus with integral biometric-based access control system 10 is powered by a battery as will be further defined hereinbelow, thus access to the interior of the personal storage device 15 could be lost should the battery loose power. Thus, located on the exterior surface of the personal storage device 15 are a battery compartment 30 and a battery compartment interlock switch 35. In this manner, the user could replace the battery from the outside of the personal storage device 15, and regain access. Also located on the exterior of the personal storage device 15 is a biometric sensor 40. The biometric sensor 40 is envisioned to be a fingerprint sensor as depicted in this figure; however, other types of sensors such as retina scanning, facial scanning, voice scanning and the like could also be used with equal effectiveness, and as such, should not be interpreted as a limiting factor of the present invention. The biometric sensor 40 works with internal circuitry to be further described hereinbelow, to lock and unlock a solenoid-based access device 45. While the individual user must determine the final basis of security and the associated value of any items or information contained within the personal storage device 15, it is envisioned that enclosure material 50 used in the construction of the personal storage device 15 would be available to suit different requirements. It is envisioned that personal storage device 15, such as notebooks, wallets and the like that may contain lower value items would be made of conventional materials such as leather and vinyl. Such materials would keep casual observers out, be lightweight and still retain their aesthetic qualities. Other personal storage device 15 such as computer cases, purses, and the like which may contain a larger amount of valuables, or valuables of higher value would be reinforced with higher strength materials such as aluminum, steel, Kevlar, and the like.

Figure 1A:
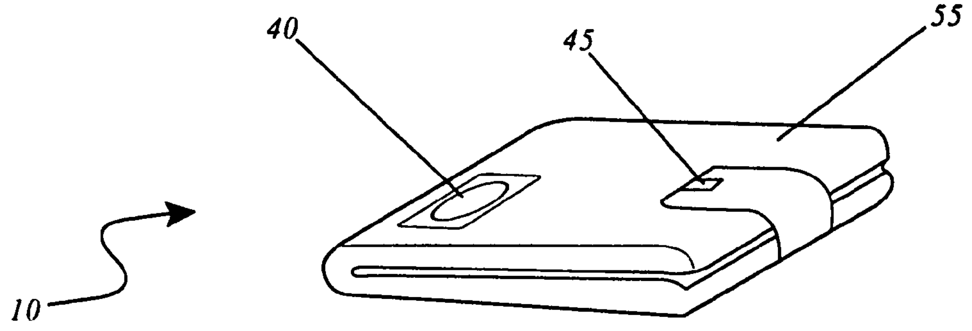

Referring next to FIG. 1*a*, an isometric view of the portable storage apparatus with integral biometric-based access control system 10 shown in use on a wallet 55 is disclosed. This figure clearly depicts the versatility of the portable storage apparatus with integral biometric-based access control system 10 and its ability to be readily adapted to any storage container similar in design to a wallet 55. The wallet 55 has the required biometric sensor 40 located on its exterior along with a solenoid-based access device 45.

Figure 1B:
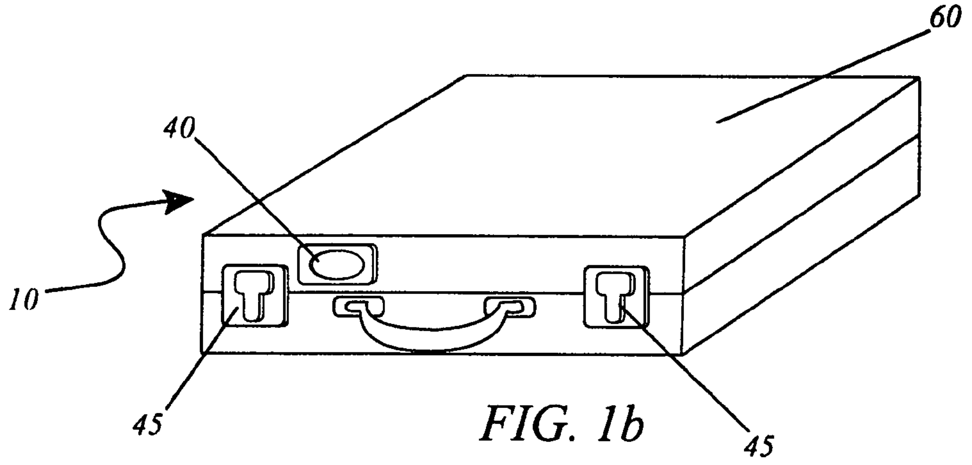

Referring now to FIG. 1*b*, an isometric view of the portable storage apparatus with integral biometric-based access control system 10 shown in use on a computer case 60 is depicted. This figure clearly discloses the versatility of the portable storage apparatus with integral biometric-based access control system 10 and its ability to be readily adapted to any storage container similar in design to a computer case 60 such as a toolbox, portable file cabinet and the like. The computer case 60 has the required biometric sensor 40 located on its exterior along with a solenoid-based access device 45.

Figure 1C:
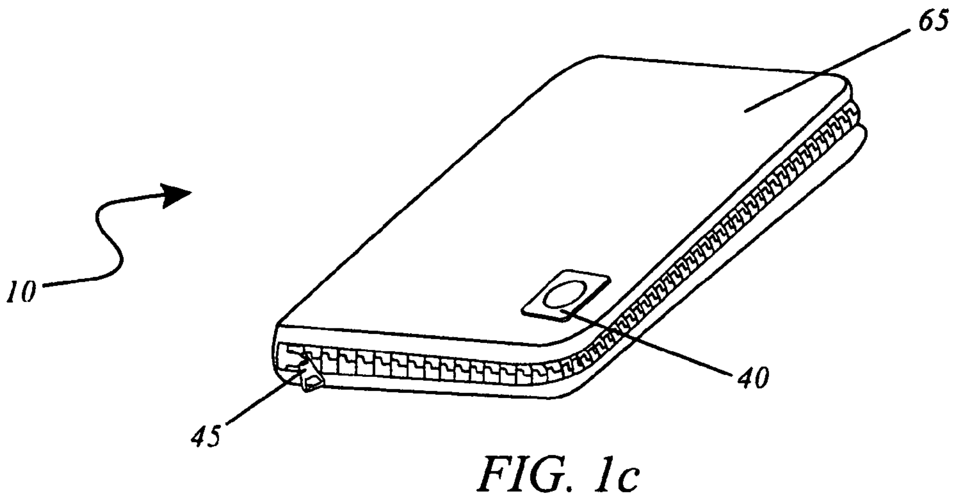

Referring next to FIG. 1*c*, an isometric view of the portable storage apparatus with integral biometric-based access control system 10 shown in use on a notebook 65 is disclosed. This figure clearly depicts the versatility of the portable storage apparatus with integral biometric-based access control system 10 and its ability to be readily adapted to any storage container similar in design to a notebook 65 such as scheduling notebook, personal digital assistant holder (PDA holder), and the like. The notebook 65 has the required biometric sensor 40 located on its exterior along with a solenoid-based access device 45.

Referring now to FIG. 2, an isometric view of the portable storage apparatus with integral biometric-based access control system 10 shown in use on a personal storage device 15 in an open and unsecured state is disclosed. In this state the securing snap 25 is lifted open exposing the interior of the personal storage device 15. It can be easily seen that the personal storage device 15 as shown in FIGS. 1*a*, 1*b*, and 1*c* would function in the same manner. The interior of the personal storage device 15 houses a first proximity receiver 70 and proximity antenna 75, which communicate with a second proximity receiver 80 via a radio frequency (RF) wave 85. In this manner, the portable storage apparatus with integral biometric-based access control system 10 can sense when the personal storage device 15 is located more than a predetermined distance away from the proximity receiver 80 as determined by a distance setting control 90. The second proximity receiver 80 would be worn on the user's body, such as in a pocket, on a belt, on a keychain or the like. A distance-setting control 90 is provided on the interior of the personal storage device 15 for the purposes of storing electronic computer data. It is envisioned that the distance setting control 90 would function in a similar fashion to a potentiometer or like device, enabling a greater benefit of manual adjustment. The memory storage device 95 will interface to the said computer through the use of an interface cable 100 and an interface connector 105 or other means, such as wireless communication. Other internal electronic components are also housed internal to the personal storage device 15, and are not visible in this figure; however, they will be described in greater detail hereinbelow. The solenoid-based access device 45 on the securing snap 25 is also clearly visible in this figure. While it is envisioned that the portable storage apparatus with integral biometric-based access control system 10 would rely on a proximity receiver for detection of theft of the personal storage device 15 from the user, it is also envisioned that some variants of the portable storage apparatus with integral biometric-based access control system 10 as depicted in FIG. 1*a*, such as a wallet, or FIG. 1*c*, such as a notebook, which would never leave the immediate presence or body area of a user, could rely on a capacitive sensor, which is well known in the art, to detect theft.

As an alternative embodiment, the design also permits multiple persons and/or pets to carry a second proximity receiver 80 such to provide child and pet protection. If a child, person, pet and/or the like carrying the second proximity receiver 80 motions a specified distance from the personal storage device 15 of a user, its internal alarm horn 125 would sound to alert the user.

Referring finally to FIG. 3, a schematic block diagram of the major electronic components of the portable storage apparatus with integral biometric-based access control system 10, is depicted. A main controller 110 such as a microcomputer or basic stamp module serves as the central controller for the portable storage apparatus with integral biometric-based access control system 10. The main controller 110 receives power from a battery 115 housed in the battery compartment 30. The battery compartment interlock switch 35 sends a signal to the main controller 110 in the event the battery compartment 30 is opened thus directing the main controller 110 to send a lock signal to the solenoid-based access device 45. The biometric sensor 40 interfaces with a biometric driving circuit 120, which in turn sends a match/no match signal to the main controller 110. When the portable storage apparatus with integral biometric-based access control system 10 is initially purchased, the retailer will program a specific number of biometric signatures, preferably up to twelve, such as fingerprints, voice scans, retinal scans or the like into the biometric driving circuit 120 using the interface connector 105 as an access point. Any further changes in authorized users will require returning to an authorized retailer who, upon proof of ownership, can reprogram the biometric driving circuit 120. In the event of a predetermined number of no match signals, envisioned to be five, the main controller 110 will direct an alarm signal to an internal alarm horn 125. The match/no match signal can also be used to provide an "unlock/lock" signal to the memory storage device 95 respectively. In this manner, the user is afforded both protection for the physical as well as the electronic data contained within the portable storage apparatus with integral biometric-based access control system 10. It is envisioned that the memory storage device 95 would be capable of containing electronic data in various size increments that are commonly available in conventional portable storage devices such as 64 MB, 128 MB, 256 MB, 512 MB, 1 GB and the like. The first proximity receiver 70 passes an electrical signal to the main controller 110 as received by the radio frequency (RF) wave 85 via the proximity antenna 75 from the second proximity receiver 80. The distance setting control 90, such as a potentiometer, governs the sensitivity of the first proximity receiver 70. It is envisioned the sensitivity of the first proximity receiver 70 could be adjusted from a few feet such as would be necessary in a car or at a desk, to perhaps a hundred feet to work in a home or office environment. Should the distance between the proximity antenna 75 and the second proximity receiver 80, as determined by the distance setting control 90 be exceeded, the main controller 110 would activate the internal alarm horn 125 to alert the user, the suspected thief, and others nearby, that a possible theft of the personal storage device 15 equipped with the portable storage apparatus with integral biometric-based access control system 10 is in progress.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user who has little or no training in a simple and effortless manner. Upon purchase of the portable storage apparatus with integral biometric-based access control system 10 in any variation as depicted in FIG. 1, FIG. 1*a*, FIG. 1*b* or FIG. 1*c*, the user would have the authorized retailer program, the biometric sensor 40 with his or her biometric signature, and that of other authorized users. Such biometric signature is envisioned to be a fingerprint, a voice scan, a retina scan, a facial scan or any other unique biometric profile. At this point, the portable storage apparatus with integral biometric-based access control system 10 is ready for use.

When the user wishes to access the portable storage apparatus with integral biometric-based access control system 10, he or she would initiate a biometric scan at the biometric sensor 40, in the event of a match, the main controller 110 would open the solenoid-based access device 45 allowing access. Such access is not only to the physical contents within the personal storage device 15, the wallet 55, the computer case 60 or the notebook 65, but also access to any electronic data within the memory storage device 95 as well. Both read and write access from and to the memory storage device 95 are performed through the interface cable 100 and the interface connector 105 or a wireless connection. When completed with the accessing duties, the user would once again initiate a biometric scan at the biometric sensor 40 to secure the portable storage apparatus with integral biometric-based access control system 10, thus resetting the portable storage apparatus with integral biometric-based access control system 10 for its next use cycle.

In the event of repeated unsuccessful biometric attempts, the personal storage device 15 would activate its internal alarm horn 125 to alert the user, the possible thief and others in the nearby areas that a possible theft is in progress. Such activation would also occur when the portable storage apparatus with integral biometric-based access control system 10 is moved away from the user's body in the event of a capacitive sensor, or away from the second proximity receiver 80 greater than a predetermined distance as previously set by the distance setting control 90 on the first proximity receiver 70. Such a feature not only protects the electronic and physical objects inside the portable storage apparatus with integral biometric-based access control system 10 from access and theft, but protects the entire portable storage apparatus with integral biometric-based access control system 10 as well.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable storage apparatus with an integral biometric-based access control system comprising:

- a personal storage device comprising an interior;
- a solenoid-based access device disposed in said personal storage device for providing selectable access to said interior;
- a biometric sensor capable of sensing biometric features of a user;
- a biometric driving circuit in electrical communication with said biometric sensor for generating a match signal or a no match signal based on active comparison of at least one biometric signature to said biometric features of said user;
- a data storage device for storing electronic data;
- a controller in electrical communication between said biometric driving circuit, said solenoid-based access device, and said data storage device, said controller generates a lock or an unlock signal based upon said match or said no match signal and communicates said lock or said unlock signal to said solenoid based access device and said data storage device;
- a first proximity receiver disposed within said personal storage device and in electrical communication with said controller for receiving a radio signal;
- a second proximity receiver disposed on said user and in radio communication with said first proximity receiver for transmitting said radio signal;
- a distance control setting in electrical communication with said first proximity receiver for adjustably setting said radio signal such that said second proximity receiver is in radio communication with said first proximity receiver within only a predetermined distance;
- an alarming unit disposed on said personal storage device for signaling an audible alarm upon receiving an alarm signal from said controller; said alarm signal being generated by receipt of a repeated plurality of said no match signals from said biometric driving circuit or when said second proximity receiver is not in radio communication with said first proximity receiver; and,
- a power supply for providing power to said portable storage apparatus with an integral biometric-based access control system;

wherein said power supply further comprises a battery, a battery compartment, and a battery compartment interlock switch;

wherein said battery compartment interlock switch sends a signal to said controller which sends said lock signal to said solenoid-based access device when said battery compartment is opened;

wherein said at least one biometric signature is programmed within said biometric data circuit;

wherein upon sensing said biometric features of said user, and confirming a match of said biometric features with said at least one biometric signature within said biometric data circuit, said controller actuates said solenoid-based access device to provide access to said interior of said personal storage device; and wherein upon sensing said biometric features of said user, said controller provides access to said data storage device.

2. The apparatus of claim 1, wherein said personal storage device further comprises a laptop-style notebook portable computer.

3. The apparatus of claim 1, wherein said personal storage device further comprises a purse.

4. The apparatus of claim 1, wherein said personal storage device further comprises a wallet.

5. The apparatus of claim 1, wherein said personal storage device further comprises a briefcase.

6. The apparatus of claim 1, wherein said personal storage device further comprises a PDA.

7. The apparatus of claim 1, wherein said personal storage device further comprises a personal planner.

8. The apparatus of claim 1, wherein said personal storage device further comprises a handbag.

9. The apparatus of claim 1, wherein said biometric sensor further comprises a fingerprint scanner.

10. The apparatus of claim 1, wherein said biometric sensor further comprises an eye retina scanner.

11. The apparatus of claim 1, wherein said biometric sensor further comprises voiceprint recognition software.

12. The apparatus of claim 1, further comprising an interface cable and connector for interfacing said data storage device with a computer.

13. The apparatus of claim 1, wherein said user is a child or pet for the purposes of locating said child or said pet.

14. A method for providing an automatic audible alarm to prevent theft and unauthorized access of personal property, said method comprising the steps of:

providing a portable storage apparatus with an integral biometric-based access control system comprising:

a personal storage device comprising an interior for storing said personal property;

a solenoid-based access device disposed in said personal storage device for providing selectable access to said interior;

a biometric sensor capable of sensing biometric features of a user;

a biometric driving circuit in electrical communication with said biometric sensor for generating a match signal or a no match signal based on active comparison of at least one biometric signature to said biometric features of said user;

a data storage device for storing electronic data;

a controller in electrical communication between said biometric driving circuit, said solenoid-based access device, and said data storage device, said controller generates a lock or an unlock signal based upon said match or said no match signal and communicates said lock or said unlock signal to said solenoid based access device and said data storage device;

a first proximity receiver disposed within said personal storage device and in electrical communication with said controller for receiving a radio signal;

a second proximity receiver disposed on said user and in radio communication with said first proximity receiver for transmitting said radio signal;

a distance control setting in electrical communication with said first proximity receiver for adjustably setting said radio signal such that said second proximity receiver is in radio communication with said first proximity receiver within only a predetermined distance;

an alarming unit disposed on said personal storage device for signaling an audible alarm upon receiving an alarm signal from said controller; said alarm signal being generated by receipt of a repeated plurality of said no match signals from said biometric driving circuit or when said second proximity receiver is not in radio communication with said first proximity receiver; and, a power supply for providing power to said portable storage apparatus with an integral biometric-based access control system;

wherein said power supply further comprises a battery, a battery compartment, and a battery compartment interlock switch; and wherein said battery compartment interlock switch sends a signal to said controller which sends said lock signal to said solenoid-based access device when said battery compartment is opened;

loading said at least one biometric signature into said biometric driving circuit;

adjustably setting said distance control setting such that said radio signal only transmits said predetermined distance;

disposing said personal property within said interior of said personal storage device;

disposing said second proximity sensor on said user;

transporting said portable storage apparatus with an integral biometric-based access control system;

by inputting said biometric features of said user into said biometric sensor, such that said biometric driving circuit actively compares said inputting said biometric features of said user with said at least one biometric signature to access said interior of said personal storage device;

providing access to said interior of said personal storage device when said biometric features of said user matches said at least one biometric signature, such that said biometric driving circuit transmits said match signal to said controller which transmits said unlock signal to said solenoid-based access device;

restricting access to said interior of said personal storage device when said biometric features of said user mismatches said at least one biometric signature, such that said biometric driving circuit transmits said no match signal to said controller which transmits said lock signal to said solenoid-based access device;

providing said audible alarm when said controller receives said repeated plurality of said no match signals from said biometric driving circuit due to repeated mismatching comparisons of said biometric features of said user and said at least one biometric signature; and, providing said audible alarm when said first proximity receiver is not in radio communication with said second proximity receiver due to said second proximity receiver being outside of said predetermined distance.

* * * * *